Dec. 8, 1970    L. D. GROOM III, ETAL    3,546,568
THRESHOLD DEVICE ENERGIZER
Filed May 22, 1968    4 Sheets-Sheet 1
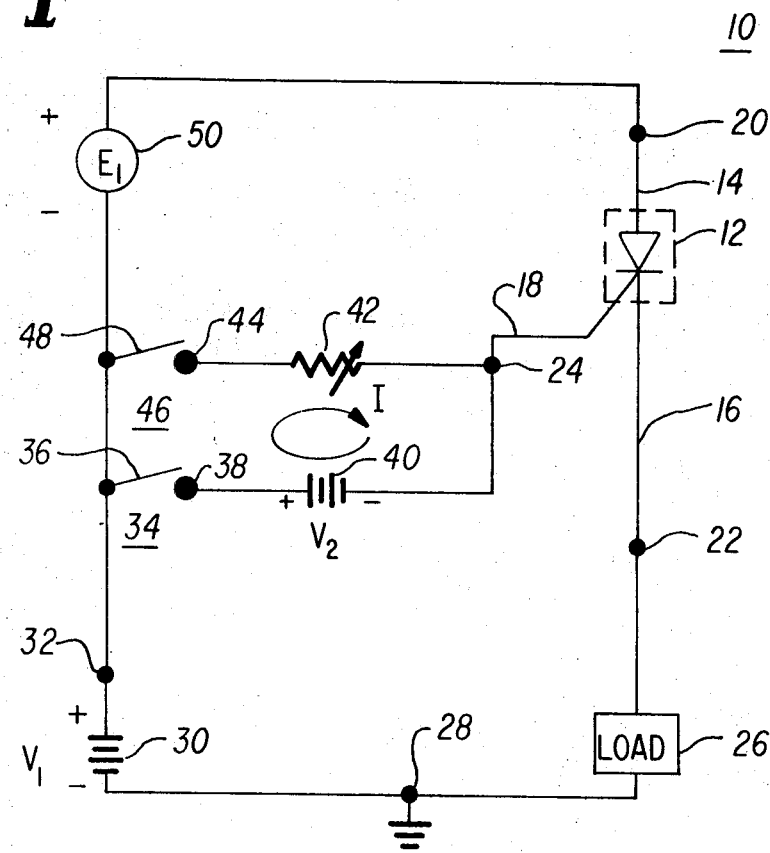
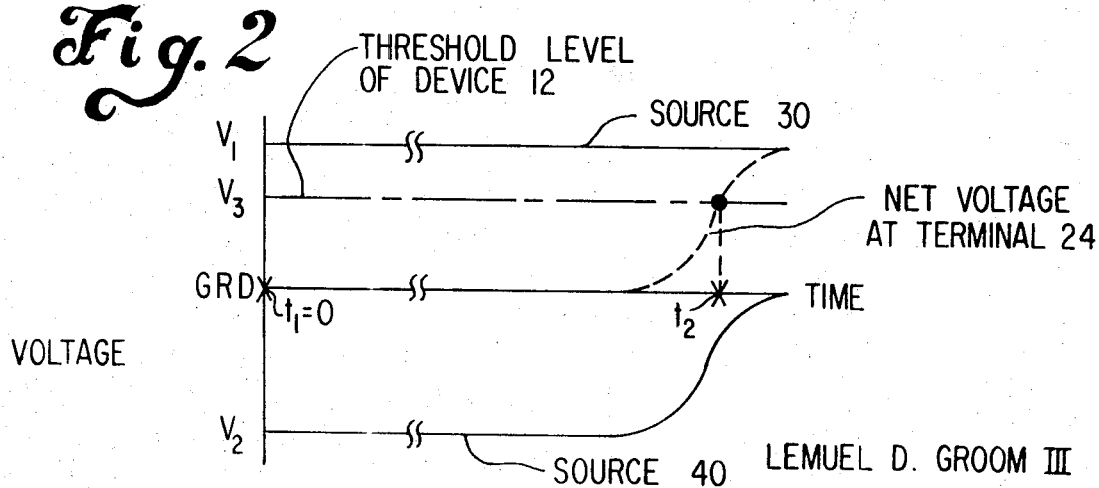
LEMUEL D. GROOM III
JAMES M. GARRETT
INVENTORS
BY René E. Grossman
ATTORNEY Dec. 8, 1970   L. D. GROOM III, ETAL   3,546,568
THRESHOLD DEVICE ENERGIZER
Filed May 22, 1968   4 Sheets-Sheet 3

United States Patent Office 3,546,568
Patented Dec. 8, 1970

3,546,568
THRESHOLD DEVICE ENERGIZER
Lemuel D. Groom III, Houston, and James M. Garrett, Dallas, Tex., assignors to Texas Instruments Incorporated, Dallas, Tex., a corporation of Delaware
Filed May 22, 1968, Ser. No. 731,105
Int. Cl. G05f 3/00
U.S. Cl. 323—19
29 Claims

ABSTRACT OF THE DISCLOSURE

A control circuit which has a semiconductor controlled rectifier (SCR) which is energized by an energizing signal after a predetermined time period. Connected to the gate of the rectifier are two batteries in series which may be of equal magnitude and opposite in polarity with an impedance (for example, a resistor) connected in parallel across one of said batteries. After the predetermined time period, the battery having the impedance in parallel therewith is discharged sufficiently such that the combined voltage output of the batteries is sufficient to produce the energizing signal to the gate of the SCR, energizing said SCR and thereby energizing the load.

---

The invention relates to a control circuit and more particularly to a circuit for changing an existing state on a threshold detecting circuit after the occurrence of a predetermined condition.

Accordingly, it is an object of the present invention to provide a control circuit which actuates a threshold detecting circuit after a predetermined condition and which is simple of design and operation, yet exceptionally reliable and accurate.

Another object is to provide a control circuit which changes the condition of a threshold device after a predetermined time period.

Another object is to provide a control circuit which requires relatively few components and is inexpensive to produce.

Still another object is to provide a control circuit which is light in weight, small in size, and lends itself particularly to microminiaturization.

Other objects and features of the invention will become more readily understood from the following detailed description and appended claims when read in conjunction with the accompanying drawings, in which like reference numerals and symbols designate like parts throughout the figures thereof, and in which:

FIG. 1 is a schematic diagram illustrating one embodiment of the control circuit of the present invention.

FIG. 2 is a graph illustrating voltage versus time waveforms at certain points in the circuit illustrated in FIG. 1.

Figure 3:
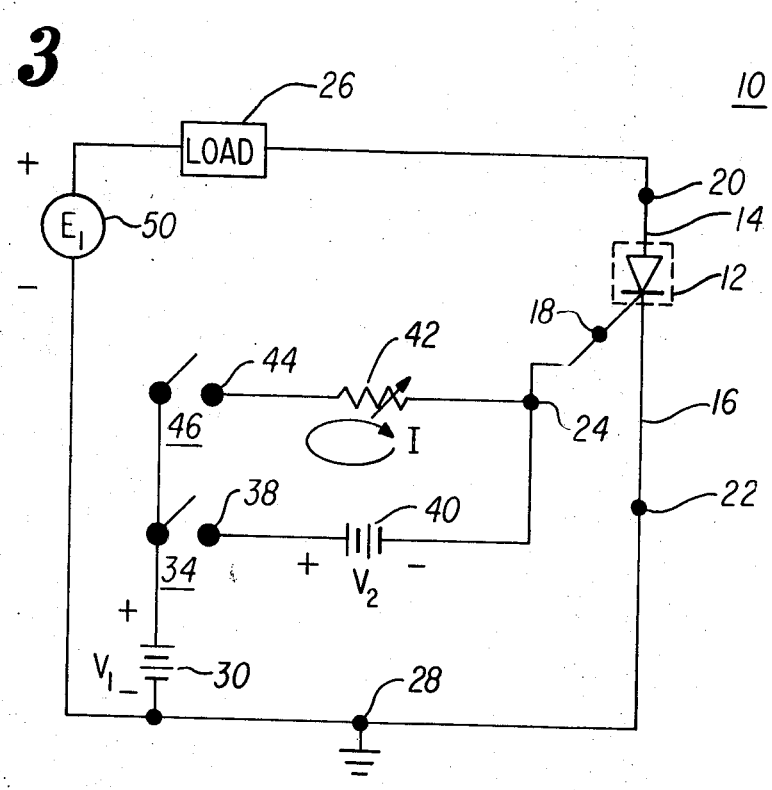
FIGS. 3 through 7 are schematic diagrams illustrating other embodiments of the invention wherein the energizer portion of the control circuit is located at different points in said circuit.

Referring now to FIG. 1, there is illustrated the control circuit 10 comprising a threshold detector or gated switch 12 which may be, by way of example, a semiconductor controlled rectifier (SCR) having anode, cathode and gate electrical leads, 14, 16 and 18, respectively. A property of a semiconductor controlled rectifier is that it is nonconducting until a certain threshold potential is applied to its gate lead, after which it is rendered conducting or energized and will so remain until power is removed from the circuit that includes its cathode and anode. By way of example, an SCR that will operate in the circuit of FIG. 1 is Texas Instruments Incorporated TIC-44. Leads 14, 16 and 18 of SCR 12 (the latter being identified in the drawings solely by the number 12) are connected to terminals 20, 22 and 24, respectively. Load 26 is connected to cathode 16 via terminal 22 and to ground via terminal 28. A first energy source 30 of $V_1$ volts, for example, has its negative side connected to ground through terminal 28 while its positive side is connected by way of terminal 32 to switch 34 via contact arm 36. Contact 38 of switch 34 is connected to the positive side of a second energy source 40 of $V_2$ volts, for example, while the negative side of source 40 is electrically connected with gate lead 18 of rectifier 12 via terminal 24. Also connected to terminal 24 is one lead of impedance means 42, which, for example, may be a variable resistor, while the other lead of said impedance means is connected to contact 44 of switch 46. Impedance 42 is thus connected in parallel with energy source 40, a feature which cooperates to provide the several advantageous results of the present invention. Contact arm 48 of switch 44 is connected to terminal 32 and to the negative side of energy source 50, for example, a voltage supply of $E_1$ volts. The positive side of said voltage supply 50 is electrically connected with anode 14 of rectifier 12 via terminal 20. Energy sources 30, 40 and 50 may be, by way of example, solid-state batteries, nickel cadmium batteries or mercury cells while switches 34 and 46 may be of the single pole, single throw type made by ALCO, model MST–105E.

In operation, with switches 34 and 46 open, rectifier 12 is initially nonconducting since no potential is present on its gate lead 18. Accordingly, no power is supplied to load 26. For explanation purposes, it will be assumed that a threshold level of approximately $V_3$ volts (see FIG. 2) which produces a gate trigger current ($I_{GT}$) at gate terminal 24 will be required to energize rectifier 12, and thereby complete the circuit to load 26. Also, voltage $V_1$ from source 30 will be assumed to be approximately equal to voltage $V_2$ from source 40. When both switches 34 and 46 are closed at time $t_1 = 0$ (see FIG. 2), initially the potential at gate terminal 24 is approximately zero since voltages $V_1$ and $V_2$ are approximately equal, opposite in polarity and connected in series between terminals 24 and 28. Furthermore, the voltage at cathode terminal 22 is also approximately zero since no definable current is flowing through load 26. The result is that the initial gate-to-cathode voltage of rectifier 12 is near zero and under this condition the rectifier is in a nonenergized or nonconducting state.

In order to change the state of rectifier 12 from nonconducting to conducting (and thereby supply power to the load 26), the potential at gate terminal 24 must be greater than that existing at cathode 16, i.e., the gate-to-cathode junction must be forward biased. This is accomplished by depleting or discharging the voltage $V_2$ of source 40 which is bucking out or neutralizing the voltage $V_1$ of source 30. Voltage $V_2$ of source 40 is depleted at a predetermined time period after the closure of switch 46 by the passage of current I (shown in FIG. 1) through impedance means 42. The time $t_2$ for energy source 40 to become depleted to a level where rectifier 12 is energized ($V_3$ of FIG. 2) is dependent upon the shunt load across energy source 40, which is primarily defined by impedance means 42 (assuming $R_{42}$ is substantially larger than the internal impedance of source $V_2$) as well as the decay rate or capacity of the battery, assuming that energy source 40 is a battery. This predetermined time period $t_2$ for the rectifier 12 to be energized may be expressed by the following equation:

$$t_2 \text{ (hours)} = \frac{CR_{42}}{V_2} \tag{1}$$

in which the capacity C (in ampere hours) is defined for source 40 when the absolute magnitude of the difference between source 30 of $V_1$ volts and the decaying voltage of energy source 40 of $V_2$ volts at least equals the absolute magnitude required to render rectifier 12 conductive (i.e., $|V_1-V_2|=V_3$ in FIG. 2), and $R_{42}$ is the value of impedance means 42 in ohms. Assuming that impedance means 42 is a variable resistor, the time required for energy source 40 to be discharged or depleted will thus vary directly with the value of resistor 42; that is, as resistor 42 is increased $t_2$ is increased. The time period $t_2$ may not only be varied or calibrated by varying the value of resistor 42, but also by pre-draining, pre-discharging or pre-depleting the capacity C of source 40 by a predetermined amount, which additionally aids in varying $t_2$.

Referring specifically to FIG. 2, it can be seen that at time $t_1$ when switches 34 and 46 are closed, the net voltage at terminal 24 or gate 18 is zero since voltages $V_1$ and $V_2$ are equal in magnitude and opposite in polarity. Although the magnitude of energy sources 30 and 40 have been illustrated in FIG. 2 as being substantially equal in magnitude, the essential requirement for energizing the threshold device 12 is that the absolute value of the difference between voltages $V_1$ and $V_2$ equal or exceed the threshold level ($V_3$) of the switch or threshold device 12. Accordingly, voltages $V_1$ and $V_2$ may initially be unequal in magnitude within the purview of this invention but, for explanation and illustration purposes, have been shown as being substantially equal. As source 40 becomes depleted or discharged from its initial value $V_2$ through resistor 42 by the passage of current I through said resistor, its magnitude decreases at a rate which depends not only upon the value of resistor 42 but also its decaying or capacity characteristics. As energy source $V_2$ is depleted, energy source 30 is no longer completely neutralized, so that the net combined output voltage which appears at terminal 24 (that is, gate 18) increases in positive magnitude and approaches $V_3$, the threshold level of rectifier 12. At time $t_2$ (determined by the above equation), rectifier 12 will begin conducting through load 26 under the driving potential of $E_1+V_1$ volts.

Switches 34 and 46 may be ganged. Sources 30, 40 and 50 may all be batteries of the mercury cell type. Also within the practice of this invention for certain applications, switch 34 may be omitted from FIG. 1 and terminal 38 extended and connected to lead 32. Switch 34 cooperates to avoid unwanted depletion of the batteries by leakage currents when the batteries are first inserted into the circuit.

By way of example, the following are typical values for certain components of the circuit shown in FIG. 1 according to one suitable form of the present invention:

Source 30: 1.3 volts
Source 40: 1.3 volts
Source 50: 2.6 volts
Resistor 42: 26,000 ohms
I: 50 microamperes
Capacity C: 36 milliampere hours
$V_3$: 0.65 volt
$I_{GT}$: 20 microamperes
$t_2$: 30 days FIG. 3 is another embodiment of the invention of FIG. 1 in which the negative side of source 50 is connected directly to terminal 28 instead of being electrically connected with source 30 and switches 34 and 46. This arrangement is desirable if source 30 of $V_1$ volts has small current handling capacity and load 26 requires high currents therethrough, for example, an incandescent light bulb. In this case, when threshhold device 12 is conducting through load 26, it will be under the driving potential of $E_1$ volts only and large currents passing through load 26 will not affect source 30. Load 26, it should be noted, is connected between the positive (+) side of source 50 and the threshold device 12. This arrangement is equally applicable to the other embodiments disclosed herein.

Figure 4:
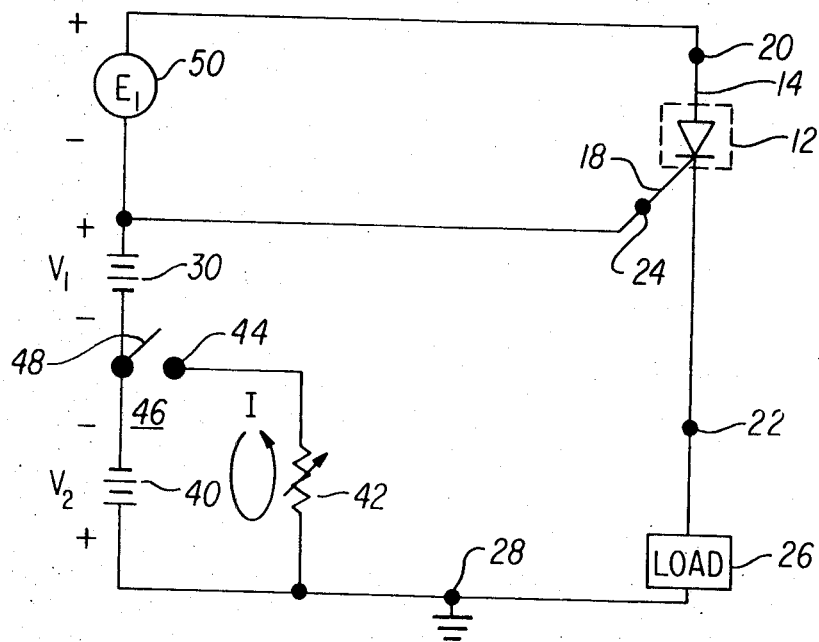

FIG. 4 illustrates another embodiment of the invention illustrated in FIG. 1. In the circuit according to FIG. 4, the positive terminal of source 40 is connected directly to ground via terminal 28 while the negative side of source 40 is connected to the negative side of source 30 as well as one side of switch 46. The positive side of source 30 is connected both to the negative side of voltage supply source 50 as well as to gate terminal 24. Variable impedance 42 is connected in parallel across source 40, one lead of said impedance being electrically connected to ground while the other lead is connected to contact 44. Anode terminal 20 of threshold device 12 is connected to the positive side of voltage supply 50 while the load 26 is electrically interconnected with cathode terminal 22 and ground terminal 28. In operation, the circuit shown in FIG. 4 performs in the same manner as that described for the circuit shown in FIG. 1. Upon closure of switch 46, source 40 of $V_2$ volts will be depleted at a predetermined rate dependent upon the value of impedance 42 and the capacity C of source 40, thereby allowing the combined voltage at gate terminal 24 to rise until it at least equals $V_3$ (see FIG. 2), at which time rectifier 12 is energized and completes the circuit to load 26. Time $t_2$ is calculated from Equation 1 above as described in reference to FIG. 1.

Figure 5:
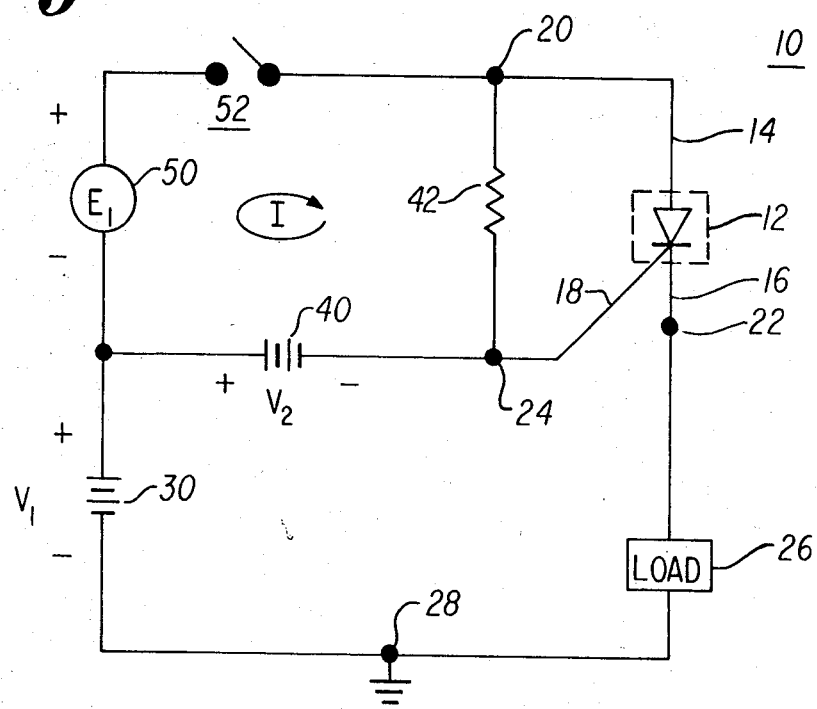

FIG. 5 illustrates still another embodiment of the invention wherein impedance means 42 is electrically connected from gate terminal 24 to anode terminal 20, i.e., across source 40 and source 50. After closure of switch 52, a current I will flow through impedance means 42 dependent upon the value of $E_1$, $V_2$ and impedance means 42. Equation 1 above will be valid in the circuit of FIG. 5 for $t_2$ except that the denominator $V_2$ shown in Equation 1 will be replaced by $V_2+E_1$. In operation, the current 1 will flow as indicated in FIG. 5 depleting both sources 40 and 50 until the voltage of source 40 has depleted or discharged an amount such that the combined voltage of $V_1$ plus the depleted voltage $V_2$ is sufficient to produce a gate trigger current to turn device 12 from a nonconducting to a conducting state. In this form of the invention, the capacity of source 50 must be greater than that of source 40 in order that when threshold device 12 is energized there is sufficient voltage and current capacity remaining in source 50 to supply power to load 26.

Figure 6:
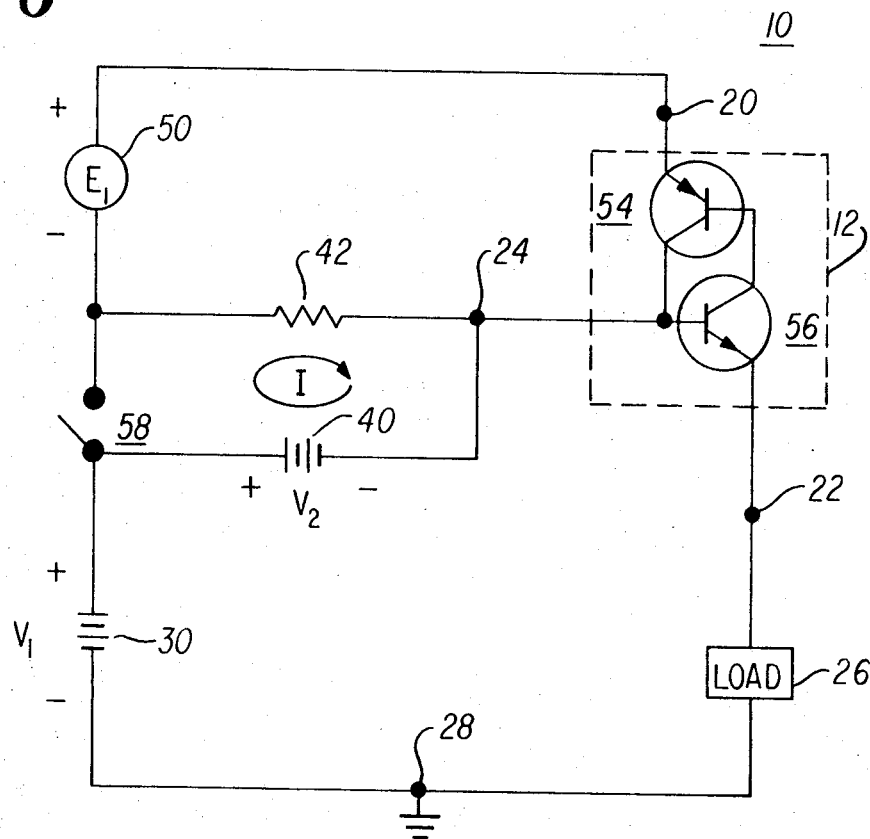

FIG. 6 illustrates yet another embodiment of the invention illustrated in FIG. 1, wherein threshold or bistable device 12 is comprised of two transistors, pnp transistor 54 and npn transistor 56. Transistors 54 and 56 could be, by way of example, Texas Instruments Incorporated transistors 2N3702 and 2N3704, respectively. Threshold device 12 has three output leads connected to various terminals, namely the emitter lead of transistors 54 connected to terminal 20, the emitter lead of transistor 56 connected to terminal 22 and the collector of transistor 54 and base of transistor 56 connected to terminal 24. The base of transistor 54 is connected to the collector of transistor 56. One side of resistor 42 is connected to terminal 24 while the other side is connected to the negative side of source 50 and one side of switch 58. Source 40 is connected to terminal 24 and the other side of switch 58.

The operation of the transistor threshold detector 12 shown in FIG. 5 is similar to that of the SCR threshold detector circuit shown in FIG. 1. Initially, both transistors 54 and 56 are nonconducting since the voltage at terminal 24 is essentially at zero (assuming $V_1$ is approximately equal to $V_2$). Furthermore, the voltage at terminal 22 is essentially zero since no definable current is flowing through load 26. Switch 58 is closed at time $t_1=0$ (see FIG. 2). A current I flows through impedance means 42 as shown which depletes source 40. At time $t_2$, defined by Equation 1 above, the voltage of source 40 has discharged to a point such that the algebraic sum of voltages $V_1$ plus $V_2$ at least equals $V_3$, the threshold level of threshold device 12 (see FIG. 2). When the voltage at terminal 24 at least equals $V_3$, the collector of transistor 56 begins to draw current through the base of transistor 54 and through regenerative action transistors 54 and 56 begin to conduct thereby supplying power to load 26.

Figure 7:
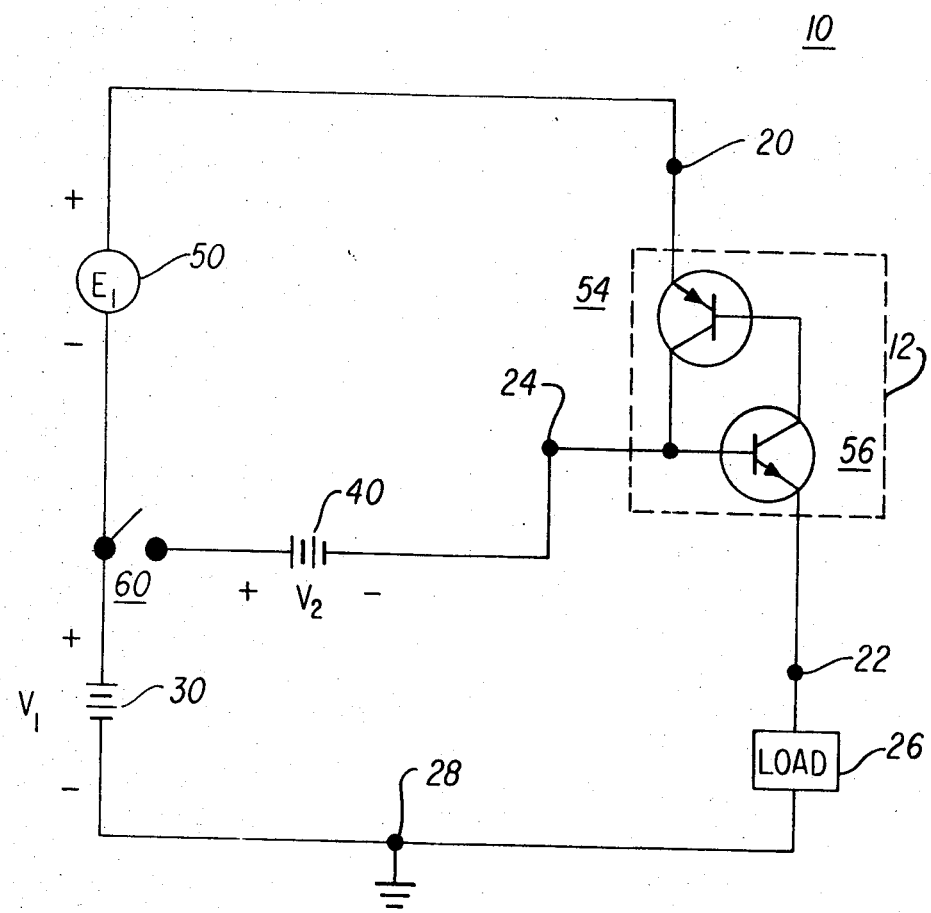

FIG. 7 illustrates still another embodiment of the circuit illustrated in FIG. 5 and is the same as FIG. 5 except that impedance 42 and switch 58 have been omitted while switch 60 is interconnected between the positive side of source 40 and the negative side of source 50 (which is also electrically connected to the positive side of source 30). Sources 30 and 40 are opposite in polarity and are of such magnitude that the absolute magnitude of the difference between $V_1$ and $V_2$ does not equal the threshold level of bistable device 12. Assume that electrical source 40 has a definable natural decay or discharge rate. After a predetermined time period which is dependent upon that decay rate or shelf life, the absolute value of the difference between $V_1$ and the decaying $V_2$ will at least equal the threshold value of bistable device 12, thereby energizing the device and allowing power to be supplied to load 26. It should be noted that source 30 may also be decaying at a second decay rate; the important consideration is that the combined decay rates are effective to produce an electrical potential at terminal 24 after a predetermined time period which at least equals the threshold level of device 12.

In summary, this control circuit provides an arrangement by which opposed energy sources are utilized to generate a voltage that will increase in magnitude as one of the sources becomes depleted. This control circuit, used in connection with a threshold detecting device as a reference, provides a programmable reference with minimum complexity, which is simple, low cost, has a relatively small number of components, is adapted to mass production techniques and yet can be easily varied or calibrated to vary the time delay characteristics of the circuit. The depleted energy source should have a reasonably definable capacity as expressed by its ampere hour parameter which will allow depletion rate to define voltage versus operating life of the source.

Although the present invention has been shown and illustrated in terms of a specific apparatus, it will be apparent that changes or modifications can be made without departing from the spirit and scope of the invention as defined by the appended claims.

What is claimed is:
1. A control circuit, comprising:
   (a) a threshold device having a conductive and a nonconductive state and including at least three input leads,
   (b) a first voltage source and load electrically connected to the first and second input leads of said device,
   (c) a second voltage source,
   (d) a third voltage source electrically interconnected to said second voltage source with the combined voltage output of said second and third voltage sources being electrically interconnected to the third input lead of said device,
   (e) an impedance means electrically connected with said third voltage source,
   (f) whereby the current flowing through said impedance means and said third voltage source substantially reduces the magnitude of said third voltage source over a predetermined time period, the combined magnitude of said second voltage source and reduced magnitude of said third voltage source being effective to produce a potential at said third input lead that changes the state of said device from nonconductive to conductive and thereby complete a circuit from said first voltage source to said load.

2. A control circuit according to claim 1 wherein said second voltage source is opposite in polarity to said second voltage source.

3. A control circuit according to claim 1 wherein said third voltage source is substantially equal in magnitude to said second voltage source.

4. A control circuit according to claim 1 wherein said impedance means is a resistor.

5. A control circuit according to claim 4 wherein said resistor is variable to vary said predetermined time period.

6. A control circuit according to claim 4 wherein said predetermined time period is defined by $CR/V$, where C is the capacity of said third source, R is the total resistance in parallel with said third source, and V is the output of said third source.

7. A control circuit according to claim 1 wherein said threshold device is a semiconductor controlled rectifier.

8. A control circuit according to claim 1 wherein said device is a transistor threshold device.

9. A control circuit according to claim 1 wherein said second and third voltage sources are batteries.

10. A control circuit for energizing a load after a predetermined time period, comprising:
    (a) a threshold device having an energizing state and a deenergizing state and including at least three input leads,
    (b) a first voltage source and said load electrically connected to the first and second input leads of said device,
    (c) a second voltage source,
    (d) a battery providing a third voltage source, said second source and said battery being electrically interconnected with the voltage output of said battery bucking said second voltage source,
    (e) said battery being of opposite polarity and producing a voltage substantially equal to that of said second voltage source when said device is in a deenergized condition,
    (f) a resistor electrically connected in parallel with at least one of said second voltage source and said battery, at least one of said second voltage source and said battery also being electrically connected with said third input lead,
    (g) whereby after a predetermined time period the combined voltage output at said third input lead is sufficient to change the state of said threshold device from nonconducting to conducting and thereby complete the circuit from said first voltage source to said load.

11. A control circuit according to claim 10 wherein said resistor is variable to vary the predetermined time period.

12. A control circuit according to claim 10 wherein said threshold device is a semiconductor controlled rectifier.

13. A control circuit according to claim 10 wherein said threshold device is a transistor threshold device.

14. A control circuit comprising:
    (a) a threshold device having a conductive and nonconductive state for completing an electrical connection to a load when a threshold voltage is applied to a lead of said device,
    (b) a first voltage source,
    (c) a second voltage source in electrical opposition to said first voltage source, the combined voltage output of said first and second sources being electrically interconnected to said lead of said device,
    (d) an impedance means electrically connected with said second voltage source,
    (e) whereby after a predetermined condition the current flowing through said impedance means and said second voltage source reduces the magnitude of said second voltage source, the combined magnitude of said first and reduced magnitude of said second voltage source being effective to produce said threshold voltage at said lead to render said device conductive and thereby complete said electrical connection to said load.

15. A control circuit for energizing a threshold device with a threshold signal comprising:
(a) a first source having an output sufficient to energize said device,
(b) a second source in opposition to said first source and having an output sufficient to prevent said first source from energizing said device, the combined output of said first and second source being coupled to said device, and
(c) means for reducing the output of said second source whereby the combined output of said first and second source at least equals said threshold signal, thereby to energize said threshold device.

16. A control circuit for energizing a threshold device with a threshold signal comprising:
(a) a first voltage source having an output sufficient to energize said threshold device,
(b) a second voltage source in opposition to said first voltage source and having an output sufficient to prevent said first source from energizing said device, the combined output of said first and second voltage sources being interconnected with said device, and
(c) means for reducing the output of said second voltage source whereby the combined output of said first and second voltage source at least equals said threshold signal after a predetermined condition, thereby to energize said threshold device.

17. A control circuit according to claim 16 wherein said means for reducing is an impedance means.

18. A control circuit for energizing a threshold device with a threshold signal comprising:
(a) a first voltage source having an output sufficient to energize said threshold device,
(b) a second voltage source in opposition to said first voltage source and having an output sufficient to prevent said first voltage source from energizing said device, the combined output of said first and second voltage source being interconnected with said device, and
(c) impedance means for reducing the output of said second voltage source whereby the combined output of said first and second voltage source at least equals said threshold signal, thereby to energize said device.

19. A control circuit according to claim 18 wherein said first voltage source is a battery.

20. A control circuit according to claim 18 wherein said second voltage source is at least a battery.

21. A control circuit according to claim 20 wherein said first battery output is substantially equal in magnitude and opposite in polarity to said second battery.

22. A control circuit according to claim 20 wherein said second voltage source is a partially discharged battery.

23. A control circuit according to claim 18 wherein said impedance means is a resistor in parallel with said second voltage source.

24. A control circuit according to claim 23 wherein said resistor is variable.

25. A control circuit according to claim 23 wherein said device is energized after a time interval defined by $CR/V$, where C is the capacity of the second voltage source, R is the total resistance in parallel with said second source, and V is the output of said second source.

26. A control circuit for energizing a threshold device with a threshold signal, comprising:
(a) a first battery having an output sufficient to energize said threshold device,
(b) a second battery in electrical opposition to said first battery and having an output sufficient to prevent said first battery from energizing said device, the combined output of said first and second batteries being interconnected with said device, and
(c) impedance means in parallel with said second battery, whereby the current flowing through said impedance means and said second battery substantially reduces the output of said second battery, the combined output of said first battery and reduced output of said second battery being effective to produce said threshold signal, thereby energizing the device.

27. A control circuit for energizing a threshold device with a threshold signal comprising:
(a) a first source having an output sufficient to energize said threshold device,
(b) a second source in opposition to said first source and having a predetermined decay rate with the initial output of said second source being sufficient to prevent said first source from energizing said device,
(c) the combined output of said first and second sources being interconnected with said device whereby the output of said first source and the decaying output of said second source produces the threshold signal at said threshold device, thereby energizing said device.

28. A control circuit according to claim 27 wherein said first voltage source has a predetermined decay rate whereby the combined decay rates of said first and second source are effective to produce the threshold signal, thereby to energize said device.

29. A control circuit according to claim 27 wherein said second source is at least a battery.

References Cited

UNITED STATES PATENTS

| | | | |
|---|---|---|---|
| 3,206,612 | 9/1965 | Swanekamp et al. | 307—252 |
| 3,209,154 | 9/1965 | Maring | 307—252X |
| 3,340,460 | 9/1967 | Clarke et al. | 307—252X |
| 3,343,152 | 9/1967 | Hart | 340—249 |

J D MILLER, Primary Examiner

A. D. PELLINEN, Assistant Examiner

U.S. Cl. X.R.

307—146, 293; 323—31, 41